United States Patent [19]
Berner

[11] 4,185,861
[45] Jan. 29, 1980

[54] PORTABLE CANINE TOILET
[76] Inventor: Charles R. Berner, 40-70 Hampton St., Elmhurst, N.Y. 11373
[21] Appl. No.: 894,727
[22] Filed: Apr. 10, 1978

Related U.S. Application Data
[63] Continuation-in-part of Ser. No. 825,523, Aug. 17, 1977.

[51] Int. Cl.² .............................................. A01K 29/00
[52] U.S. Cl. .................................................. 294/19 R
[58] Field of Search ............ 294/19 R, 1 R, 55, 99 R, 294/160, 115, 116; 15/257.1, 257.7; 119/1 R; 150/3, 1, 5, 12; 229/62, 64, 66; 248/99, 100

[56] References Cited
U.S. PATENT DOCUMENTS

| | | | |
|---|---|---|---|
| 3,777,708 | 12/1973 | Vogt | 294/19 R |
| 4,005,892 | 2/1977 | Williams | 294/1 R |
| 4,010,970 | 3/1977 | Campbell | 294/19 R |

*Primary Examiner*—James B. Marbert
*Attorney, Agent, or Firm*—Constantine A. Michalos; Peter C. Michalos

[57] ABSTRACT

A portable canine toilet having a frame with foldable arms for the holding of waste receiving bags, a first container removably attached to the frame for storing a multiplicity of clean bags which slide along the extended arms when ready for use, a second container attached to the frame for temporary storage of used bags, a telescopic handle for retracting and thereby facilitating the removal of the used bags, and rubber type feet attached to the frame to provide non-slip lever action for optimum control of positioning the toilet apparatus when in use.

4 Claims, 11 Drawing Figures

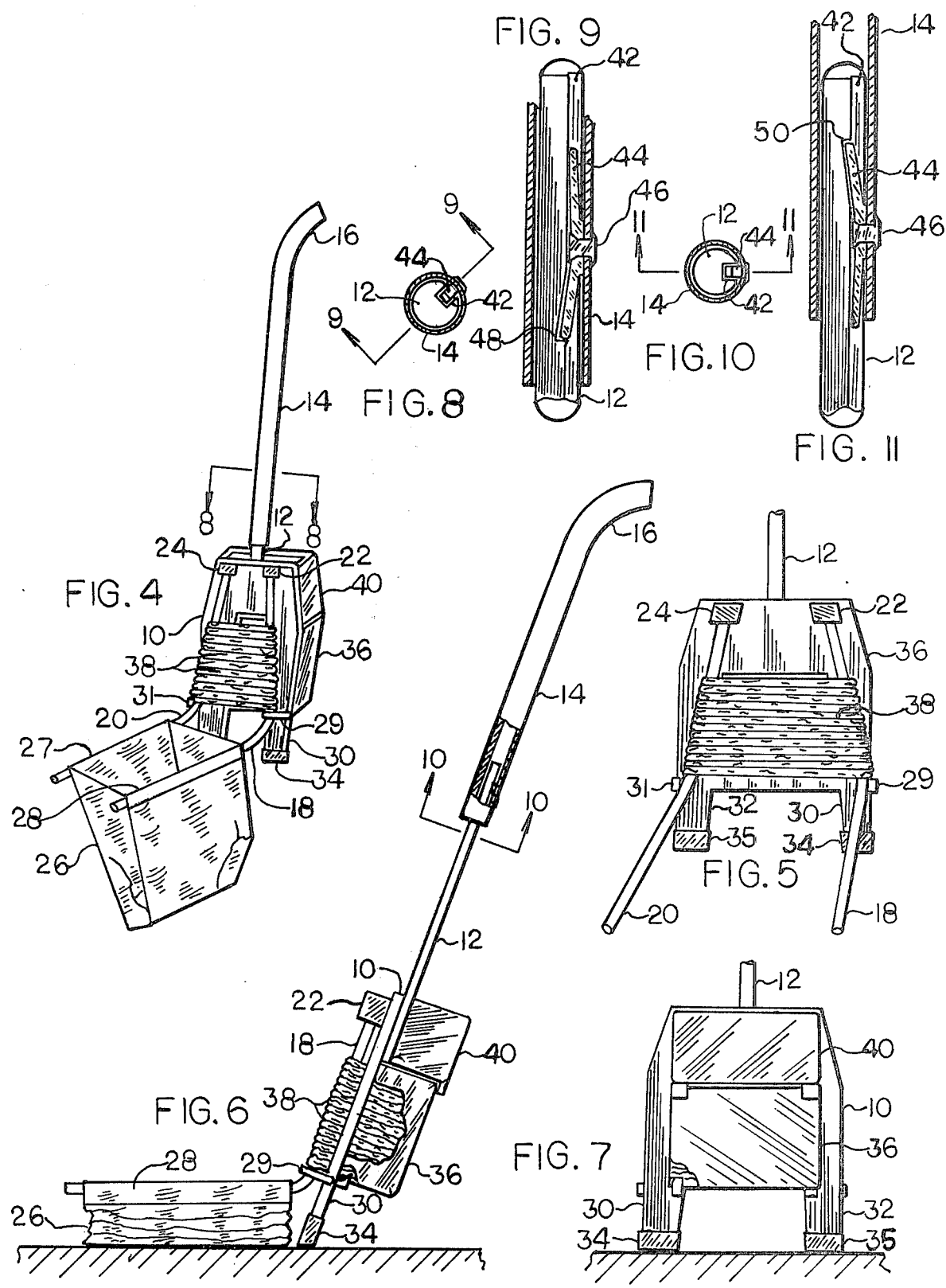

PORTABLE CANINE TOILET

CROSS REFERENCES TO RELATED APPLICATIONS

This application is a continuation-in-part of U.S. patent application Ser. No. 825,523 filed Aug. 17, 1977.

BACKGROUND OF THE INVENTION

1. Field of the Invention

In general, this invention relates to sanitation equipment. More particularly, the invention is concerned with a portable canine toilet having disposable waste receiving bags.

2. Description of Prior Art

Previous types of waste receiving devices for dogs have presented certain problems which have limited their usefulness to dog owners. For example, scoop types were cumbersome to use which caused embarrassment to the dog owner. Some canine toilet versions were too heavy and would cause tiring of the dog owner's arm. Other types were either relatively expensive or did not provide for multiple clean bags. Even if these types did utilize detachable bags then it was awkward to attach amd remove them which also caused embarrassment to the pet owner.

These problems have been solved to a large extent by the present invention which provides a portable, lightweight, and relatively inexpensive apparatus having leverage control for proper positioning of the waste receiving bag. The invention also provides for a multiple clean bag container, a used bag container, a telescopic handle, and foldable bag receiving arms for compact storage.

The present invention thus provides for a convenient and efficient apparatus for disposing of dog wastes which does not embarrass the pet owner.

SUMMARY OF THE INVENTION

During the past several years there has occurred a large increase in the dog population in the United States. This has created a serious health and sanitation problem due to the large amount of waste material left behind by these dogs. Therefore, many towns and cities have enacted ordinances requiring pet owners to clean up the waste material left by their pets.

The present invention fulfills this need by providing a portable canine toilet having disposable bags, a multiple clean bag container, a used bag compartment, a telescopic handle, foldable bag receiving arms, and leverage control for positioning the ready to use bag.

Accordingly, a major object of the invention is to provide a canine toilet that is portable, convenient to use and does not embarrass the pet owner.

Another object of the invention is to provide leverage control which adjusts the height of the waste receiving bag and does not tire the pet owner's arm while the apparatus is being held in position.

A further object of the invention is to provide a multiple bag container which permits each bag to be pulled into position quickly and easily when ready for use and disposed of conveniently after use.

Still another object of the invention is to provide an apparatus having a telescopic handle for ease of removing the used bags and foldable bag holding arms so that the apparatus may be stored in a compact space when not in use.

BRIEF DESCRIPTION OF THE DRAWINGS

FIG. 4 is a perspective view of another embodiment of the invention of the canine toilet apparatus showing the receiving bag in an open position and held in place by the extended arms and the telescopic handle in a retracted position.

FIG. 5 is a front elevational view of the frame showing the clean bag storage container and the receiving arms in an extended position.

FIG. 6 is a side elevational view of the apparatus with the receiving bag in a ready to use position and the telescopic handle in an extended position.

FIG. 7 is a rear elevational view of the frame showing the clean and used bag storage containers.

FIG. 8 is a sectional view of the telescopic handle in a closed position taken along lines 8—8 of FIG. 4.

FIG. 9 is a cross sectional view taken along lines 9—9 of FIG. 8.

FIG. 10 is a sectional view of the telescopic handle in an extended position taken along line 10—10 of FIG. 6.

FIG. 11 is a cross sectional view taken along 11—11 of FIG. 10.

DESCRIPTION OF THE PREFERRED EMBODIMENT

Figure 1:
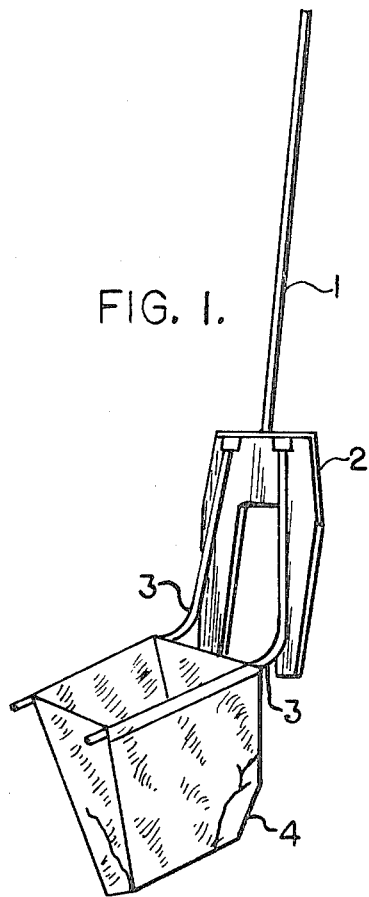
FIG. 1 is a perspective view showing one embodiment of the invention of the canine toilet apparatus showing the removable bag in place for use by the pet owner.
Figure 2:
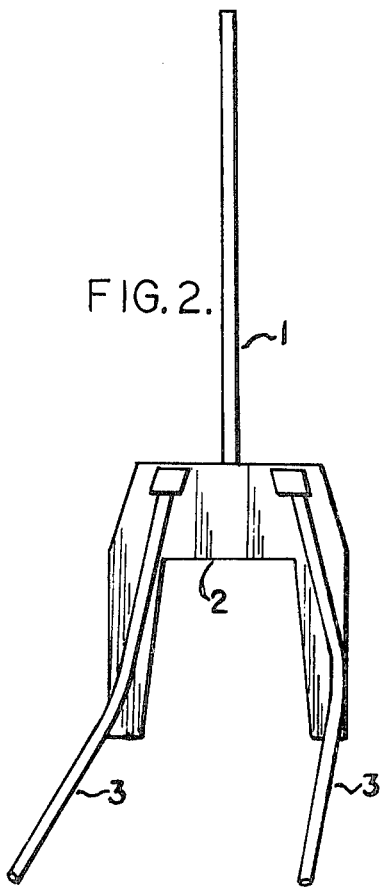
FIG. 2 is another perspective view of the embodiment of FIG. 1 with the bag removed.
Figure 3:
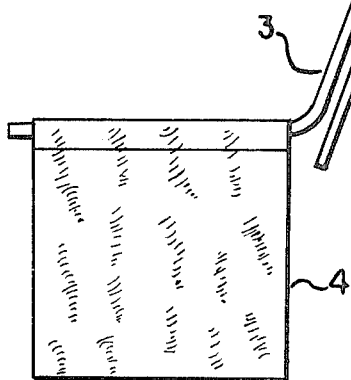
FIG. 3 is a side view of the embodiment of FIGS. 1 and 2.

Referring to FIGS. 1 to 3 of the drawing a handle 1 supports a frame 2 having parallel arms 3—3 which hold a disposable bag 4 ready for use on an open position. These arms 3—3 are curved at their center sections so that the upper and lower section form an obtused angle as shown best in FIG. 3.

Referring to FIGS. 4 to 11 of the drawing the second embodiment of the invention shows frame 10 supporting the various elements of the canine toilet. The frame 10 itself is supported by two feet 30, 32 which have rubber tips 34, 35 in order to prevent slipping.

Two parallel arms 18, 20 are provided which hold a disposable bag 26 in an open position when ready to use. These arms 18, 20 are curved at their center sections so that the upper and lower sections from an obtuse angle as shown in FIG. 6. This configuration provides greater ease of handling of the apparatus. In addition, the arms 18, 20 are free to rotate about their longitudinal axis by means of joints 22, 24 connected to the frame 10 so that the arms may be folded for compact storage when the apparatus is not in use.

The disposable bag 26 is made of durable plastic or paper with an open top and configured to have hollow sleeves at two opposite upper edges 27, 28. In this manner the bag 26 may be held in an open position when the sleeves 27, 28 engage the extended arms 18, 20.

A first container 36 is removably mounted on the frame 10 for storing clean bags 38. This container 36 has an open front and partially closed bottom sections so that these bags 38 may be guided in or out of the container 36 by means of the holding arms 18, 20 which engage the sleeves 27, 28. This configuration permits a folded and compact storage for the clean bags 38.

Supported on the frame is a pair of retention fingers 29 and 31 juxtapositioned to the arms 18 and 20 so that in a closed position said fingers retain the clean bags within the container 36.

A second container 40 is attached to the frame 10. A soiled bag is temporarily stored in this container 40 until it can be disposed of later.

For compact storage of the apparatus, when not in use, a telescopic handle is provided which is comprised of an inner rod 12 which engages an outer tube member 14. The indexing and alignment action of this handle is more clearly seen in FIGS. 8 to 10. Attached to the lower end of the tube member 14 is a curved leaf spring action member 44 which slides along a groove 42 that is linearly disposed along the length of the inner rod 12. In a closed position the handle 14 is firmly indexed when the leaf spring 44 engages an indentation 48 at the lower end of the groove 42, as seen in FIG. 9. In an open position the handle 14 is similarly indexed when the leaf spring 44 engages the indentation 50 at the upper end of the groove 42, as seen in FIG. 11.

Since the groove prevents rotation of the handle 14 greater control of the apparatus is achieved during normal operation. Additional control is also obtained by means of a cane-like grip 16 at the upper end of the handle 14.

In a typical operation of the apparatus the arms 18, 20 are extended and a clean bag from the first container 36 is pulled into place. With the rubber tipped feet 34, 35 acting as the fulcrum of a lever the height of the ready to use bag 26 is adjusted to the proper position beneath the dog. Because of the lever action of the apparatus the dog owner need only apply a slight pressure to handle 16 while he waits for his dog to use the toilet apparatus and, therefore, the dog owner's arm does not become tired during this process.

A soiled bag 26 easily slips off the retaining arms 18, 20 and may be disposed in the used container 40 or may be disposed in a nearby trash can.

The invention thus provides a clean and efficient manner for disposing of dog waste material and therefore avoids embarrassment to the dog owner.

It is to be understood that the above descriptive arrangements are merely illustrative of the principles of this invention and various other arrangements and modifications may be made without departing from the spirit and scope of the invention as hereinafter claimed.

What is claimed is:

1. A portable canine toilet having disposable waste receiving bags comprising in combination:
   a frame;
   a pair of feet for supporting said frame in contact with the ground in a comfortable position until the canine is ready to use it;
   a handle for holding said frame in said position and raising it when needed;
   telescopic handle member connected to upper section of said frame;
   two parallel arms rotatably connected to front section of said frame for holding said disposable bags;
   a first container connected to lower rear section of said frame for storing clean bags;
   a second container connected to upper rear section of said frame for temporary storage of soiled bags;
   an inner rod member connected at its lower end to the upper section of said frame; said inner rod having a linearly disposed groove along its length with indentations at the upper and lower ends of said groove;
   an outer tube member engaging said inner rod; and
   a leaf spring mounted on lower section of said outer tube member, said leaf spring slidably engaging said groove so that in a closed position said leaf spring is firmly indexed in said lower indentation, and in an open telescopic position said leaf spring is firmly indexed in said upper indentation.

2. The combination of claim 1 wherein said first container is comprised of partially open front and bottom sections to permit multiple clean bags to be guided along said arms so that the clean bags may be placed in a folded position for compact storage and having fasteners so that it may be engaged and disengaged from said frame.

3. The combination of claim 1 wherein said frame is further comprised of movable retention fingers attached to the lower section of said frame and in juxtaposition to said arms so that in a closed position said fingers retain the clean bags within the first container and in an open position said fingers allow a clean bag to be slid into a ready to use position.

4. The combination of claim 1 wherein said outer tube member is further comprised of a cane-like handle at the upper end of said outer tube member in order to provide efficient control and leverage of the canine toilet.

* * * * *